April 30, 1929.                G. BORNEFELD                1,711,133
                                GAS REGULATOR
                             Filed March 8, 1928

Inventor:
Gottfried Bornefeld.

Patented Apr. 30, 1929.

1,711,133

UNITED STATES PATENT OFFICE

GOTTFRIED BORNEFELD, OF WERMELSKIRCHEN, GERMANY.

GAS REGULATOR.

Application filed March 8, 1928, Serial No. 260,190, and in Germany June 5, 1926.

The object of the present invention is to prevent the escape of gas from gas conduits for lighting and heating, and the invention consists in the provision of a double-acting safety valve arranged in the conduit and subjected to spring pressure so as to remain closed if the conduit behind the valve should not be fully open or if it should leak.

Figure 1:
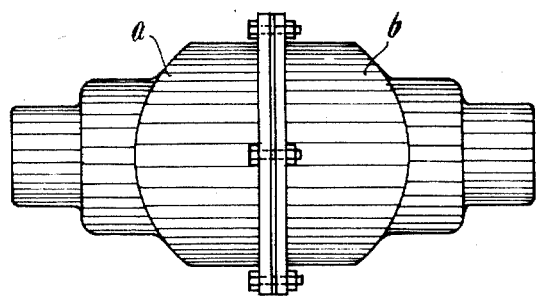

Fig. 1 of the accompanying drawings is an elevation of the valve casing, and

Figure 2:
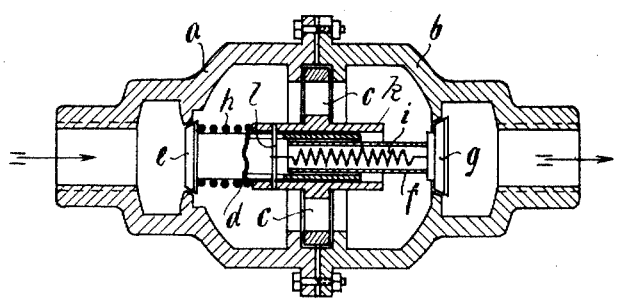

Fig. 2, a longitudinal section of the complete device.

The device comprises a casing which is divided into two detachable parts $a$ and $b$ each adapted to be screwed on to a gas piping. Each part is formed with a valve seat and has a valve which opens in the direction of the gas flow. The valve $e$ of the part $a$ is controlled by a compression spring $h$, and the valve $g$ of the part $b$ is controlled by a tension spring $i$, both springs being chosen so as to maintain the valve closed if the conduit behind the valve casing should not be fully opened or if it should develop a leak. Escape of gas with consequent detrimental result will thus be obviated.

The valve stems are tubular. The stem $f$ of the valve $g$ telescopes within the stem $d$ of the valve $e$, and the latter stem is guided within a sleeve $k$ which is carried by a slotted disc $c$ that is clamped between the two parts of the valve casing. The spring $h$ is arranged outside the stem $d$ and bears against the end of the sleeve $k$. The spring $i$ is arranged inside the stem $f$ and engages a cross-bar $l$ which is fixed to the sleeve $k$, the stem $d$ being slotted to admit the cross-bar.

When the gas acts with full pressure on the two valves, the latter open in opposition to the spring and allow the gas to pass.

I claim:

A safety valve for gas conduits comprising a casing arranged in the conduit, two co-axial valves in said casing adapted to open in the direction of the flow of the gas, said valves being provided with hollow stems, one stem being arranged to telescope within the other, and a sleeve carried by the casing as a guide for both stems, one of the springs being arranged outside the respective valve stem, the other spring being arranged inside its valve stem.

GOTTFRIED BORNEFELD.